May 9, 1967  R. E. ROYCE  3,318,417
APPARATUS FOR ELEVATING VEHICLES
Filed Oct. 7, 1965  5 Sheets-Sheet 1
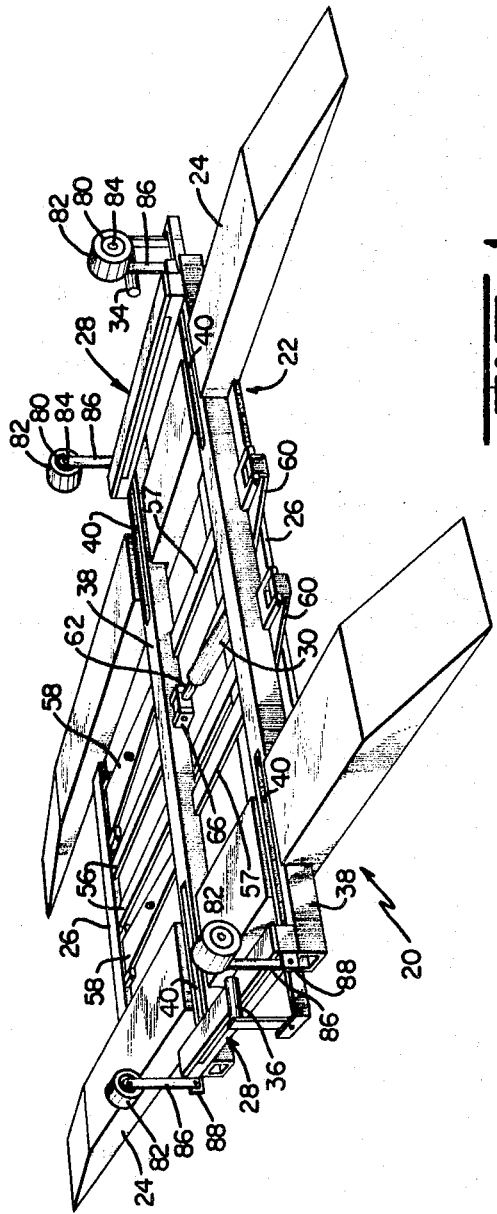
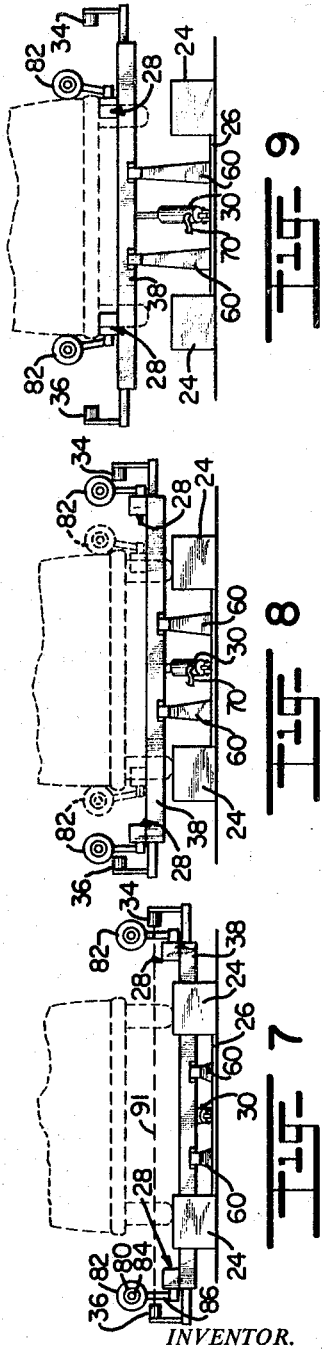
INVENTOR.
ROBERT E. ROYCE
BY *Sheridan and Ross*
ATTORNEYS

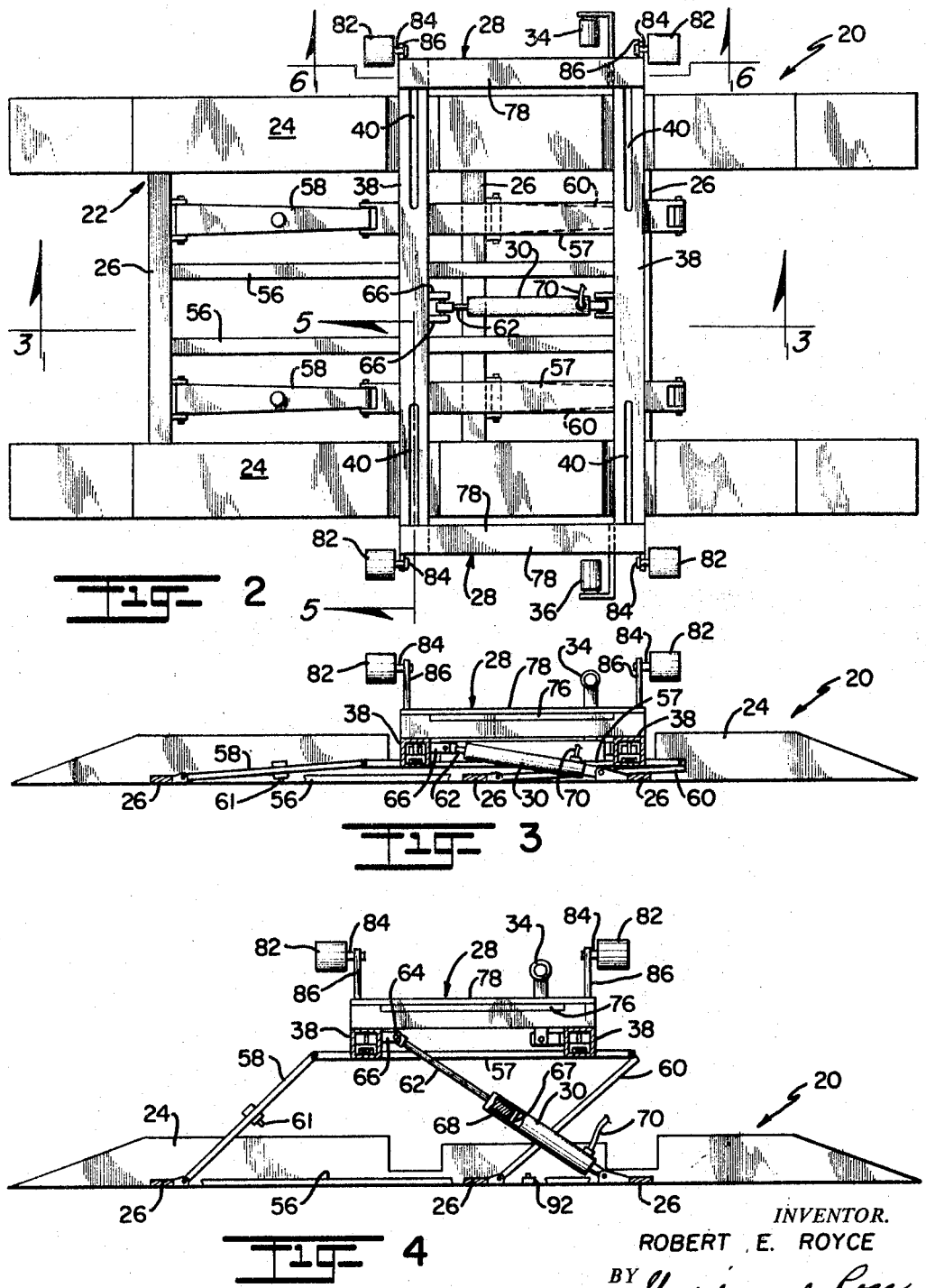

May 9, 1967  R. E. ROYCE  3,318,417
APPARATUS FOR ELEVATING VEHICLES
Filed Oct. 7, 1965  5 Sheets-Sheet 3

INVENTOR.
ROBERT E. ROYCE
BY Sheridan and Ross
ATTORNEYS

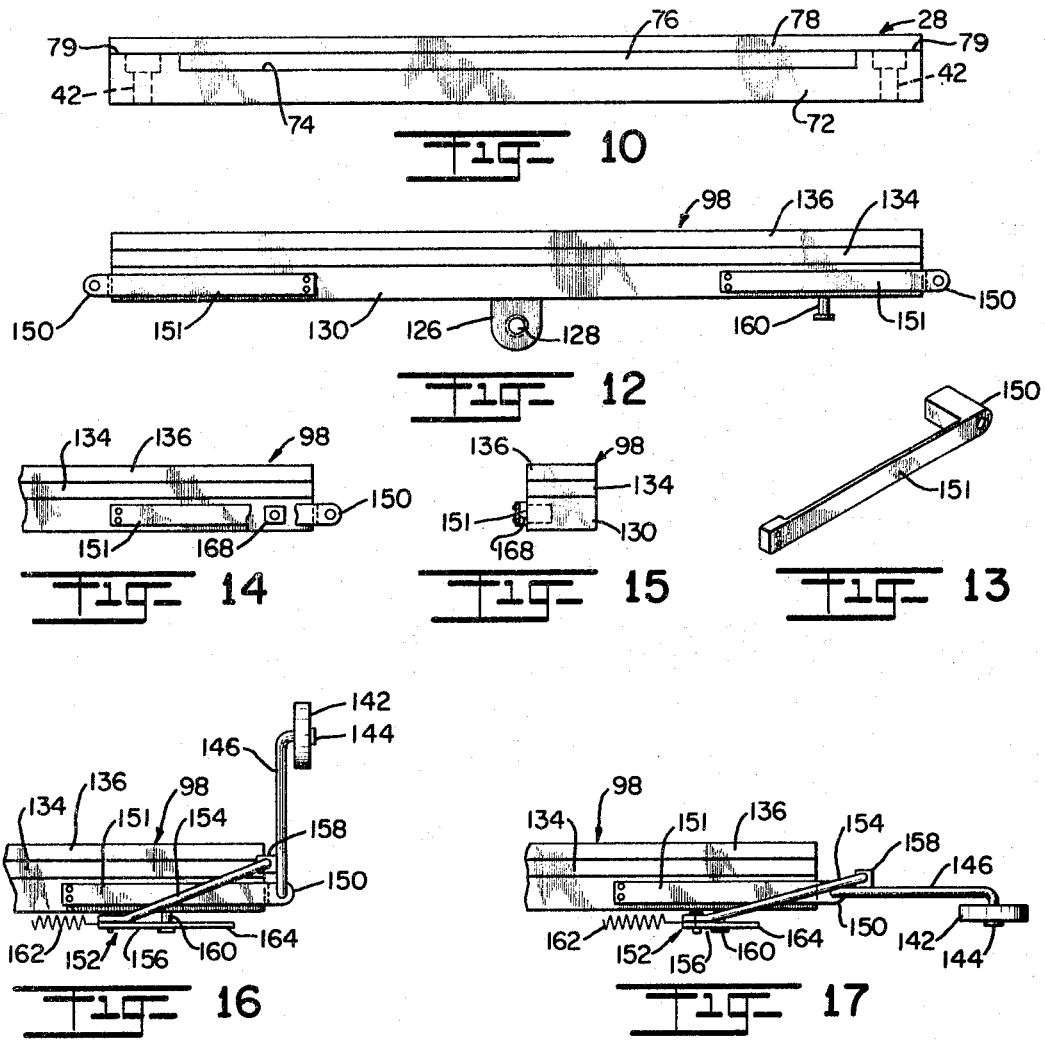

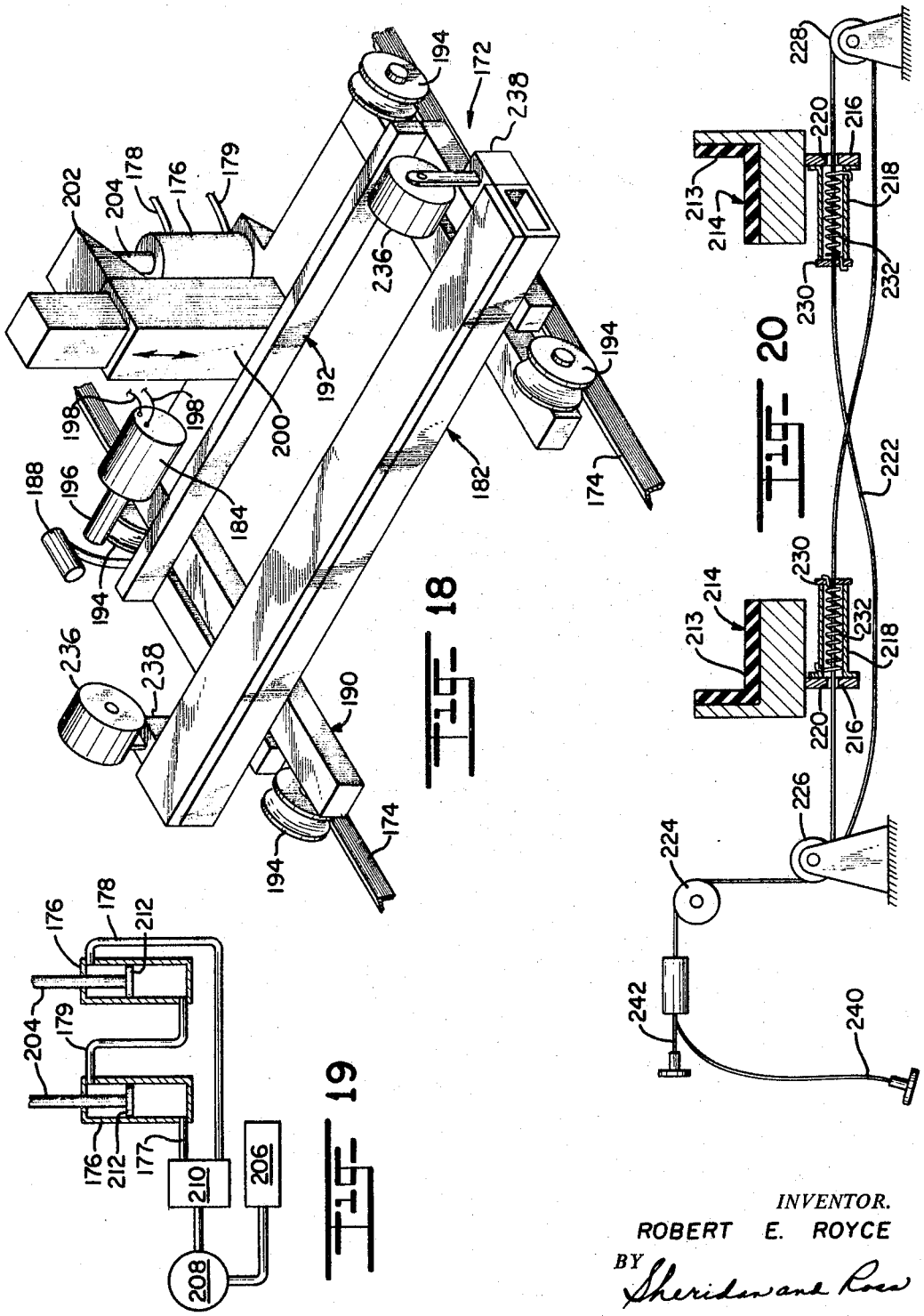

United States Patent Office 3,318,417
Patented May 9, 1967

3,318,417
APPARATUS FOR ELEVATING VEHICLES
Robert Eugene Royce, 4345 S. Santa Fe,
Englewood, Colo. 80110
Filed Oct. 7, 1965, Ser. No. 493,753
14 Claims. (Cl. 187—8.41)

This invention relates to an apparatus for elevating vehicles and more particularly to an apparatus which may be used for automatically elevating vehicles without the necessity of manually positioning vehicle engaging members and the like.

Prior art apparatuses for elevating vehicles are all disadvantageous from the viewpoint of requiring or involving manual positioning of various vehicle engaging and supporting members prior to elevating the vehicle. Such manual operations are not only time consuming but also are fraught with risk of injury to the vehicle and sometimes to the operator where done improperly. It has been found, however, that a vehicle may be automatically elevated in a simple and safe manner through the use of a unique apparatus constructed in accordance with this invention. The apparatus of this invention includes a pair of members mounted for translatory movement toward and away from each other, means for elevating said members, means for sensing a first predetermined relation between said members and a portion of a vehicle to be disposed therebetween and generating a signal in response thereto, means responsive to said generated signal for controlling said elevating means and for effecting translatory movement of said members toward each other, means for sensing a second predetermined relation between said members and a vehicle to be disposed therebetween and generating a signal in response thereto, and means responsive to said second generated signal for controlling said elevating means. Thus, by utilizing a pair of members which are automatically positioned along longitudinal edge portions of a vehicle, said vehicle may be safely, quickly and automatically elevated and lowered.

One of the principal objects of this invention is to provide an automatic apparatus for elevating vehicles.

Another object of this invention is to provide an apparatus not only for automatically elevating vehicles but also which is inexpensive to manufacture and simple and safe to operate.

Another object of this invention is to provide an apparatus for automatically elevating vehicles including a pair of support members adapted to be automatically positioned along longitudinal edge portions of a vehicle.

Another object of this invention is to provide an apparatus for elevating vehicles including a pair of members mounted for translatory movement toward and away from each other, means for elevating said pair of members, means for sensing a first predetermined relation between said members and a portion of a vehicle to be disposed therebetween and generating a signal in response thereto, means responsive to said generated signal for controlling said elevating means and for effecting translatory movement of said members toward each other, means for sensing a second predetermined relation between said members and a vehicle to be disposed therebetween and generating a signal in response thereto, and means responsive to said last generated signal for controlling said elevating means.

The foregoing and other objects and advantages will become apparent from the specification and drawings in which:

FIGURE 1 is a perspective view of one embodiment of an apparatus constructed in accordance with this invention;

FIGURE 2 is a plan view of the apparatus shown in FIGURE 1;

FIGURE 3 is a cross-sectional, elevational view taken along line 3—3 of FIGURE 2;

FIGURE 4 is a view similar to that shown in FIGURE 3 but showing the apparatus in an elevated position;

FIGURE 7 is a schematic, elevational view of one end of the apparatus shown in FIGURE 1;

FIGURE 8 is a view similar to that shown in FIGURE 7 in which said apparatus is shown in a first elevated position and the pair of vehicle engaging members are shown in a retracted position and, in phantom, in a vehicle engaging position;

FIGURE 9 is a view similar to that shown in FIGURES 7 and 8 in which said apparatus is shown in a second elevated position;

FIGURE 10 is an elevational view of a portion of one of said pair of members mounted for translatory movement toward and away from each other;

FIGURE 12 is an elevational view of another embodiment of a portion of one of said pair of members mounted for translatory movement toward and away from each other;

FIGURE 13 is a perspective view of the torsion type bar used in the apparatus shown in FIGURE 11;

FIGURE 14 is an elevational view of a portion of one of said pair of members used in the apparatus shown in FIGURE 11 with the torsion type bar partially cut away for purposes of clarity;

FIGURE 15 is a right end elevational view of the member shown in FIGURE 14, a portion of the torsion bar being removed for purposes of clarity;

FIGURE 16 is an elevational view of the bell crank assembly used in the apparatus shown in FIGURE 11;

FIGURE 17 is an elevational view similar to that of FIGURE 16 but showing the position of the bell crank when said pair of translatably mounted members are in the fully retracted position;

FIGURE 18 is a perspective view of a portion of another embodiment of an apparatus constructed in accordance with the subject invention, said portion being substantially the same as the remaining portion not shown except for the substitution of a light source for the photosensitive means 188;

FIGURE 19 is a schematic depiction of a hydraulic or pneumatic system for operating the elevating means of the apparatus shown in FIGURE 18; and FIGURE 20 is a schematic depiction of a simplified system for manually positioning a pair of translatably movable members.

Figure 5:
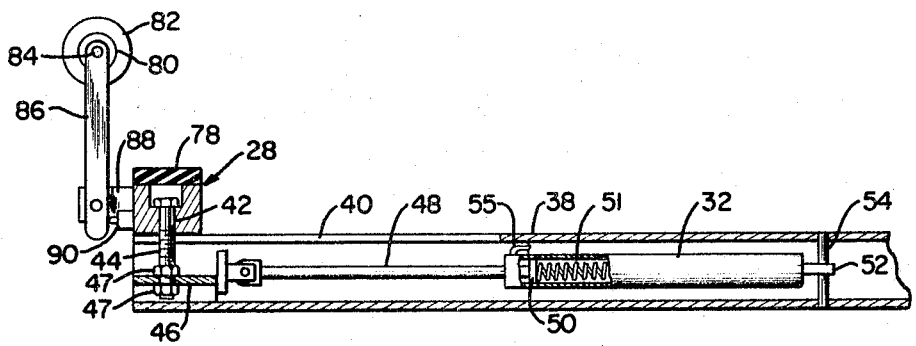
FIGURE 5 is a cross-sectional view in elevation taken along lines 5—5 of FIGURE 2.

In FIGURE 1 is shown an apparatus 20 constructed in accordance with this invention and comprising a support means 22 including a pair of ramps 24 interconnected by cross-members 26, a pair of members 28 mounted for translatory movement toward and away from each other, means for elevating said pair of members 28 including a pressurizable cylinder 30, means for effecting translatory movement of said pair of members 28 including a cylinder 32 (see FIGURE 5), and a photosensitive system including a light source 34 and a photosensitive means 36.

Figure 6:
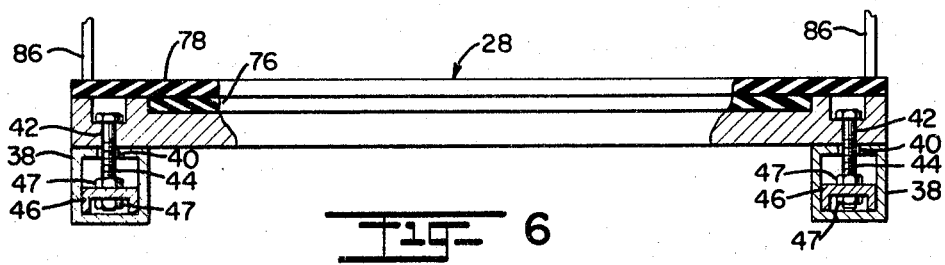
FIGURE 6 is an elevational view in partial cross-section taken along lines 6—6 of FIGURE 2.

The pair of members 28 are mounted for translatory movement upon a pair of cross members 38 toward and away from each other therealong. Each of said cross-members 38 has longitudinally extending slots 40 formed in the upper portion thereof. As shown in FIGURES 5 and 6, each of said pair of members 28 also has a pair of openings 42 formed therethrough in which is disposed a bolt 44. Each bolt 44 extends downwardly into the interior of a corresponding cross-member 38 and through an opening formed in the bottom wall of an inverted channel-shaped member 46 of relatively small longitudinal length. The bolt 44 is maintained in a predetermined relationship with respect to said channel-shaped member 46 by means of a pair of nuts 47. Each channel-shaped member 46 is suitably pivotably connected to the end of a piston rod 48. The other end of the piston rod 48 is connected to a piston 50 disposed within presure fluid cylinder 32. Piston 50 is biased by spring 51 to urge each of said members 28 away from each other. Each cylinder 32 is securely mounted with respect to a corresponding cross-member 38 such as through the use of an apertured link 52 and bolt 54. Cylinder 32 is connected to a source (not shown) of pressurized fluid through conduit 55.

Cross-members 26 are rigidly interconnected by a pair of members 56 while cross-members 38 are rigidly interconnected by members 57. Members 57 are pivotally connected at each end thereof to link members 58 and 60. The other end of each of the members 58 is pivotally connected to one of the cross-members 26 while the other end of each of the members 60 is pivotally connected to another one of the cross-members 26. At least one of the link members 58 has a depending portion 61 which insures that the link members 58 will always be slightly inclined to the horizontal when the apparatus is moved to its lowest position. This feature insures that the apparatus will always move in an upwardly direction upon application of an elevating force.

Cylinder 30 has a piston rod 62 extending from one end thereof. One end of the piston rod 62 is pivotally connected to a pin 64, see FIGURE 4, supported between a pair of apertured members 66 which are secured to one of the cross-members 38. The other end of the piston rod 62 is connected to a piston 67, see FIGURE 4. Piston 67 is preferably biased by spring 68 to urge members 28 and 38 to a lowered position. If desired, due to the force of gravity, spring 68 may be omitted. Cylinder 30 is likewise pivotally mounted to one of the cross-members 26. Cylinder 30 is connected to a source (not shown) of pressurized fluid through conduit 70.

Referring to FIGURE 10, each of the pair of members 28 comprises a base portion 72 preferably having a recess 74 formed in the upper portion thereof. A layer 76 of resilient material is securely mounted within the recess 74 by any suitable means such as bonding with an adhesive. Another layer 78 of resilient material of substantially the same thickness is bonded to the upper surface of layer 76 and the upstanding or boss portions 79 formed on the ends thereof. The thickness of each layer 76 and 78 of resilient material is preferably about one inch. The longitudinal length of each of the end portions 79 is approximately two inches. The overall length of the member 28 is approximately 47 inches. It has been found that members 28 dimensioned as indicated may be used to good advantage with practically all makes of automobiles as well as certain other vehicles.

Each of said members 28 include upstanding surface portions in the form of rollers 80 having a resilient material 82 disposed thereabout. Said rollers 80 are mounted upon a shaft 84 which has one end thereof secured to member 86. In turn, member 86 is pivotally connected to support member 88 as shown in FIGURE 5, the lower portion of member 86 is disposed adjacent a switch means 90. Thus, upon a counter clockwise pivoting of member 86, as viewed in FIGURE 5, the lower portion member 86 contacts the switch means 90 to actuate same. The purpose of this means for actuating switch means 90 will be later explained.

The operation of the apparatus 20 as shown in FIGURES 1–10 now will be described. As shown in FIGURES 1 and 3, the apparatus 20 is in the fully retracted lowered position prior to the positioning of a vehicle upon ramp 24 and between the pair of cross-members 28. A vehicle is positioned upon apparatus 20 by driving same up along the ramps 24 until the forward and rearward wheels are, respectively, positioned on opposite sides of both cross-members 38. The operator pushes a switch (not shown) which admits pressurized fluid into the cylinder 30. Cross-members 38 and said pair of members 28 are elevated until the lower portion of the vehicle interrupts a beam of light 91, shown as a dotted line in FIGURE 7, being transmitted from the light source 34 to the photosensitive means 36. Interruption of the light beam generates a signal which is used to halt the flow of pressurized fluid into cylinder 30 and to permit the flow of pressurized fluid into cylinders 32. Admission of pressurized fluid into cylinders 32 effects translatory movement of members 28 and rollers 80 toward each other and the adjacent side of the vehicle. When the resilient material 82 mounted on rollers 80 comes into contact with the adjacent side of the vehicle, each member 86 pivots outwardly away from the vehicle. The pivoting of each member 86 results in the actuation of a corresponding switch means 90. Actuation of both switch means 90 for a corresponding member 28 halts the flow of the pressurized fluid into cylinder 32 for that particular member 28. Actuation of all switch means 90 for both members 28 results in pressurized fluid flowing again into cylinder 30. Pressurized fluid continues to flow into cylinder 30 until the vehicle reaches a predetermined elevation such as that shown in FIGURE 9. When the vehicle is to be lowered, the operator again actuates a switch (not shown) which permits the pressurized fluid within cylinder 30 to flow outwardly therefrom into a reservoir (not shown). As the quantity of fluid flowing into the reservoir increases, the vehicle and cross-members 28 and 38 are, due to the effect of gravity and spring 68, slowly lowered. When the structure reaches a predetermined position, a portion of the structure contacts a switch (not shown) and actuates same. Actuation of this particular switch causes the pressurized fluid trapped within cylinder 32 to be vented to a reservoir (not shown) through conduit 55. Consequently, the force of compressed spring 51 causes the piston 50 and the connected piston rod 48 to move outwardly until each member assumes the position shown in FIGURES 1, 2 and 7. When a portion of the structure, such as one of said link members 60, reaches a predetermined elevation, a switch means 92 (see FIGURE 4) is actuated as a result of being contacted by said portion. Accordingly, the apparatus 20 as a whole remains in the position shown in FIGURES 1, 2 and 7, thereby permitting the vehicle to be driven off ramps 24.

The purpose for mounting a resilient material about rollers 80 is to prevent marring or scratching of the surface of the vehicle. The purpose of mounting the layers of resilient material upon the base portion 72 of each member 28 likewise is to prevent unncessary damage or injury to the under surface of the vehicle. Although the thickness of resilient material mounted along the entire longitudinal length of member 28 may be uniform, it has been found that a vehicle may be elevated with less risk of injury to the apparatus, the vehicle itself or surrounding personnel if the portions of the vehicle which contact the end areas 79 of the base portion 72 are permitted to "bottom" while the remaining intermediate portions are not so "bottomed." Supporting of a vehicle in this manner eliminates a tendency on the part of the vehicle to tilt as a result of any potential "centering" of the longitudinal edge of the vehicle intermediate the ends of the member 28. In other words, the formation or existence of a depending portion of the longitudinal edge of the frame will serve as a fulcrum and the vehicle will pivot about this fulcrum as determined by the position of the center of gravity of the vehicle. Such pivoting of the vehicle presents an inherently dangerous situation which could cause the vehicle to slip or fall off the apparatus. As stated, however, this tendency is eliminated through the use of a relatively thin section of resilient material adjacent the ends of member 28.

Figure 11:
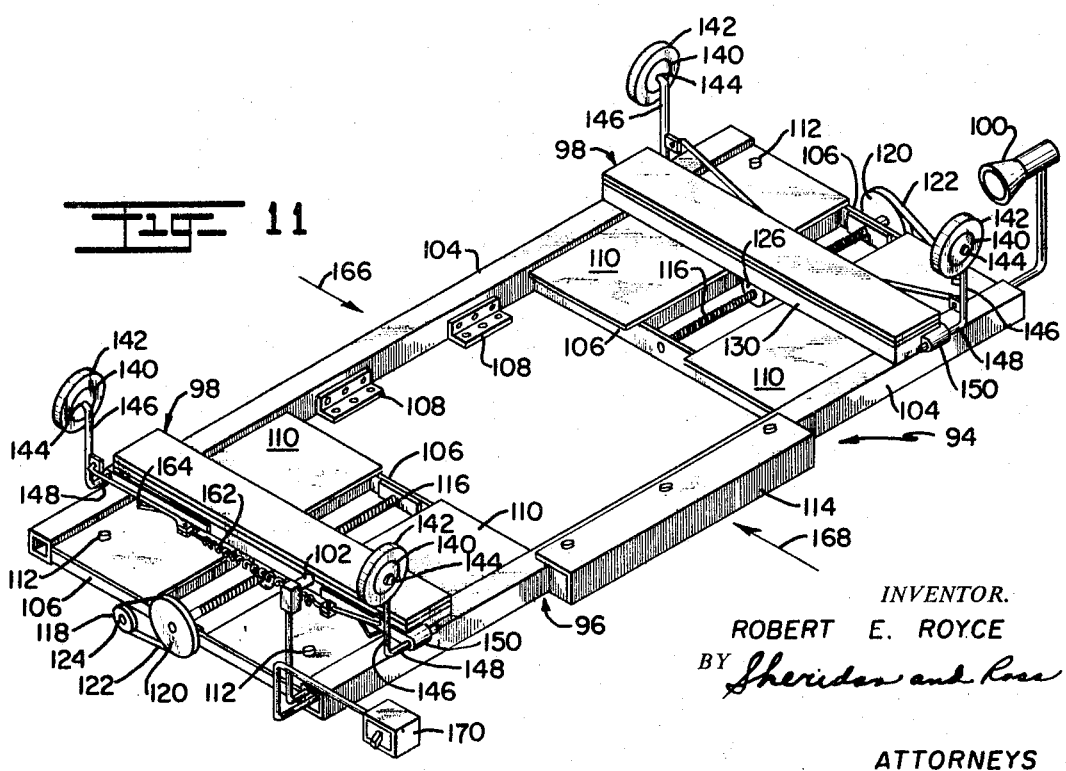
FIGURE 11 is a perspective view of another embodiment of an apparatus constructed in accordance with this invention.

In FIGURE 11 is shown another embodiment of a device to be used with an apparatus constructed in accordance with the subject invention. The device 94 is adapted to be retrofitted or mounted on a conventionally installed elevating means (not shown). Device 94, although similar in overall operation to a portion of apparatus 20, does vary from apparatus 20 in certain structural details. Device 94 comprises a support platform 96, a pair of members 98 mounted upon said platform 96 for translatory movement toward and away from each other therealong, and a photosensitive system comprising a light source 100 and a photosensitive means 102. The support platform 96 includes a pair of longitudinally extending members 104, cross-members 106, right angle brackets 108, cover plates 110 bridging portions of cross-members 106, boss or stop means 112 extending upwardly from said cover plates 110, and a housing 114 for a portion of the associated electronic circuitry. The means for effecting translatory movement of each of said pair of members 98 along the support platform 96 includes a screw member 116, a motor (not shown), a pair of pulleys 118 and 120, and a belt 122. The screw member 116 is suitably journaled for rotation within a pair of said cross-members 106. One end of said screw member 116 extends through one of said cross-members 106 and has a pulled 120 securely mounted thereon for rotation therewith. The other pulley 118 is mounted on the end of a drive shaft 124 of the motor (not shown). The belt 122 connects the pulleys 118 and 120 in a driving-driven relationship. Each of said pair of members 98 has a depending portion 126 containing an internally threaded opening 128 extending therethrough, see FIGURE 12. A screw member 116 is disposed in the opening 128 of a corresponding one of said depending portions 126.

In FIGURE 12, each of sair pair of members 98 is shown including a base portion 130 and layers 134 and 136 of resilient material securely mounted to the upper surface of the base portion 130 by any suitable means such as bonding with an adhesive. It will be understood that a plurality of layers of resilient material may be used in lieu of a single layer of resilient material.

Each of the members 98 includes upstanding surface portions in the form of rollers 140 having a resilient material 142 disposed thereabout. Said rollers are mounted for rotation upon horizontally extending portion 144 of member 146. Member 146 also contains another horizontally extending portion 148 formed at right angles to horizontally extending portion 144. Horizontally extending portion 148 is mounted for rotation within an apertured portion 150 of a torsion type bar 151 which has one end thereof securely mounted to member 98, see FIGURES 12 and 13. Member 146 is connected to a bell crank means 152 comprising a pair of pivotally connected members 154 and 156, see FIGURES 16 and 17. One end of member 154 is connected to an apertured member 158 securely attached to member 146. The other member 156 is mounted upon a bolt 160 or any suitable member depending from the lower surface of member 98. Members 154 and 156 are biased by spring 162 to keep rollers 140 and members 146 in a vertical attitude. The free end 164 of member 156 is adapted to contact boss 112 extending upwardly from a cover plate 110 and thereby cause member 156 to pivot or rotate about the bolt or depending member 160. Rotation of member 156 in turn imparts, through member 154, a rotary movement to member 146. In FIGURE 16 member 146 is shown disposed in the vertical position which, as a result of the biasing effect of spring 164, is the normal position for said member 146 when the device 94 is being used. In FIGURE 17, the member 146 is shown disposed in a horizontal position. Member 146 is horizontally disposed upon full retraction of member 98.

The operation of the device 94 as shown in FIGURES 11–17 will now be described. First of all, it will be understood that the device 94 will be mounted, through the use of right-angled brackets 108, on a suitable elevating means (not shown). Although the device 94 is shown in FIGURE 11 as being in a partially retracted but completely lowered position, it will also be understood that the members 98 will normally be fully retracted prior to positioning a vehicle therebetween, said vehicle entering in either of the directions indicated by arrows 166 and 168. As previously indicated, with members 98 in the fully retracted position, rollers 140 and the resilient layers 142 of material disposed thereabout will be horizontally disposed as shown in FIGURE 17. It has been found desirable to position rollers 140 and members 146 in a generally horizontal attitude in order to prevent same from adversely interfering with the opening of the vehicle's doors. After a vehicle has been positioned between members 98, the operator actuates switch 170, preferably a 3-position switch, which results in actuation of the elevating means (not shown). Actuation of the elevating means causes the device 94 to rise until a portion of the vehicle disposed between members 98 interrupts a light beam traveling between the light source 100 and the photosensitive means 102. Interruption of this light beam halts the vertical movement of the elevating means and activates the motor (not shown) which drive pulleys 118. Rotation of pulleys 118 causes pulleys 120 and screw members 116 to rotate. Rotation of screw members 116 results in members 98 being translated toward each other until the resilient layer of materials 142 disposed about rollers 140 is in firm contacting engagement with the adjacent side of the vehicle disposed between members 98. Following the application of a predetermined amount of pressure contact between the resilient layer 142 of each roller 140 and the adjacent side of a vehicle, each torsional type bar 151 twists sufficiently until switch 168 which is mounted within a recess formed in the side of member 98, closes. Upon actuation of switch 168, the pulleys 118 and 120 and screw members 116 stop and the elevating means (not shown) resumes its upward movement. When the device 94 reaches a predetermined elevation, another switch (not shown) is actuated thereby stopping the elevating means. When the vehicle is to be lowered, the operator again actuates the three position switch 170 which controls the elevating means thereby causing same to lower the device 94. When the device 94 reaches a predetermined elevation, another switch (not shown) is actuated which again turns on the motors that drive pulleys 118 and 120 and the screw members 116. However, the screw members 116 are rotated in the opposite direction thereby resulting in a retraction of members 98. Members 98 move away from each other until yet another switch (not shown) is actuated which shuts off the motor driving pulleys 118 and 120. In the meantime, the device 94 continues its downward movement until a predetermined, lowest level is reached. As previously described, upon retraction of the members 98, the free end 164 of each member 156 of the bell crank engages the boss or stop 112 thereby resulting in a pivoting or rotating of each member 146 until same is disposed in a generally horizontal direction.

In FIGURE 18 is shown one-half of an apparatus 172 constructed in accordance with this invention. Although only half of the apparatus is shown, the following description shall be on the basis as though the complete apparatus were shown. Apparatus 172 comprises a support means including a pair of rails 174, an elevating means including a pair of cylinders 176 connected to a source (not shown) of pressurized fluid through conduits 177, 178 and 179 (see FIGURE 19), a pair of members 182 mounted for translatory movement toward and away from each other, means for effecting translatory movement of said pair of members 182 including motors 184, and a photosensitive system including a light source (not shown) and a photosensitive means 188.

Each of said pair of members 182 is mounted upon a corresponding U-shaped member 192. Each U-shaped member 192 is supported upon a corresponding U-shaped member 190. Each U-shaped member 190 is supported by a plurality of spring loaded casters 194 and is adapted for translatory movement toward and away from each other along rails 174. Each U-shaped member 190 supports a corresponding cylinder 176 and motor 184. Each motor 184 has a drive shaft 196 which frictionally engages one of the casters 194. Each motor 184 is connected to a source (not shown) of power through lines 198.

Each U-shaped member 192 has an upstanding member 200 including a portion 202 adapted to engage the free end of a piston rod 204 which extends outwardly from one end of cylinder 176. Each U-shaped member 192 is supported upon a corresponding U-shaped member 190 and thus is adapted for translatory movement toward and away from each other as well as for vertical reciprocal movement. The latter movement is effected upon pressurization of the member's corresponding cylinder 176.

As previously indicated, each U-shaped member 190 is supported by a plurality of spring loaded casters 194. The purpose of supporting each U-shaped member 190 in this manner is to permit a limited relative vertical movement between the member 190 and the rails 174. Thus, when a vertical load of a predetermined amount is imposed upon the U-shaped members 190, the members 190 move downwardly relative to the rails 174 and seats or rests upon the ground or underlying surface thereby providing a large bearing area for the support of the load.

The purpose of U-shaped member 192 is to permit vertical elevation of member 182 relative to U-shaped member 190. Such vertical elevation is effected upon pressurization of the cylinders 176.

In FIGURE 19 is shown a schematic embodiment of an elevating means suitable for use in the apparatus 172 shown in FIGURE 18. The elevating means includes cylinders 176, a reservoir 206, a source 208 of pressurized fluid, a solenoid actuated four-way reversing valve 210, and suitable interconnecting conduits. Each of the cylinders 176 are hydraulically balanced, i.e., the volume to displacement on both sides of each piston 212 is equal and the characteristics of one of the cylinders 176 is equal to the characteristics of the other said cylinder. It will be noted that pressurized fluid will flow from the source 208 through the valve 210 and thence through either conduit 177 or through conduit 178. When the presurized fluid flows through conduit 177 to the bottom of the left hand cylinder 176, the force of the fluid causes the piston 212 to rise within the cylinder. The top portion of the left hand cylinder and the bottom portion of the right cylinder are both filled with a relatively incompressible fluid. Thus, as a result of the force exerted by the fluid against the left hand piston 212 a corresponding force is exerted upon the right hand piston. Consequently, both pistons 212 move either upwardly or downwardly at the same time and in the same distance. It will be appreciated that upon upward movement of the pistons 212 the fluid contained in the upper portion of the right hand cylinder 176 will be vented or returned by conduit 178 to the reservoir 206.

In FIGURE 20 is shown a greatly simplified apparatus for manually positioning a pair of translatably mounted members. The members 214 to be moved are members similar in function to members 28 of the apparatus shown in FIGURE 1, members 98 of the apparatus shown in FIGURE 11 and members 182 of the apparatus shown in FIGURE 18. Each of said members 214 have a layer of resilient material 213 and are securely attached to an apertured member 216. Each aperture member 216 is connected to a tubular member 218 with the opening thereof being coaxially aligned with the aperture 220 of member 216. A flexible member 222 such as a rope or the like passes through the aperture 220 of each member 216 and the opening formed through each tubular member 218. Such flexible member also passes about fixed or stationary pulleys 224, 226, and 228. More specifically, the flexible member 222 passes about pulley 224, pulley 226, thence through the left hand apertured member 216 and tubular member 218, thence about pulley 228, thence through the right hand apertured member 216 and tubular member 218 and thence again about pulleys 226 and 224. The flexible member 222 has a pair of stop portions 230 both of which are firmly secured to predetermined portions of the flexible member and each of which has one end of a tension spring 232 securely attached thereto. The other end of the tension spring 232 is securely attached to one of the corresponding apertured members 216.

The operation of the apparatus 172 is now described. The apparatus is positioned as shown in FIGURE 18. A vehicle is positioned between the members 182 in such a manner that both rails 174 are intermediate the front and rear wheels of the vehicle. The operator actuates a switch (not shown) which results in pressurized fluid being transmitted through the cylinders 176. Admission of pressurized fluid into the cylinders 176 causes U-shaped member 190 and the pair of members 182 to be vertically elevated. When the light beam traveling between the light source (not shown) and the photo-sensitive means 188 is interrupted by the lower portion of the vehicle, a switch (not shown) is actuated which interrupts the admission of pressurized fluid into cylinders 176 and actuates motors 184. Operation of motors 184 results in U-shaped members 190 and 192 and the pair of members 182 translating towards each other along rails 174. As each outstanding surface portion 236 of each member 182 comes into contact with the adjacent side of a vehicle, continued translation thereof toward the adjacent side of the vehicle produces a pivoting thereof until a switch (not shown) mounted within the housing 238 is actuated. Actuation of both of the switches (not shown) mounted within each of the boxes 238 for each member 182 operates to shut off a corresponding motor 184. When all four of the switches (not shown) are actuated as a result of pivotal movement of all four of the upstanding surface portions 236 for both members 182, both motors 184 are shut off and the pressurized fluid is again admitted into the cylinders 176. Admission of pressurized fluid into cylinders 176 results in the piston rods 204 traveling upwardly and as result of same engaging the portions 202 of upstanding members 200 cause the U-shaped member 192 and member 182 to be vertically elevated until a predetermined elevation has been effected.

Lowering of the vehicle is accomplished by the actuation of a switch (not shown) by an operator. As a result, the flow of pressurized fluid into the cylinders 176 is reversed in the manner described above in connection with FIGURE 19 and U-shaped members 192 and members 182 are lowered. When U-shaped members 192 and members 182 reach a predetermined elevation, a switch (not shown) is actuated which results in the operation of motors 184. Operation of the motors 184 results in U-shaped members 190 and 192 and members 182 translating outwardly away from the the vehicle disposed therebetween. In the meantime, U-shaped members 192 and members 182 continue to move vertically downwardly until reaching a predetermined, lowest position at which time a switch (not shown) is actuated which stops the flow of pressurized fluid into the cylinders 176. It will understood that the vehicle engaging surface portions of members 182 will be covered with a resilient material much in the same manner and for the same purpose as described above in connection with the apparatus 22 of FIGURE 1 and the device 94 of FIGURE 11.

The operation of the means for manually effecting translation of members 214 as shown in FIGURE 20 is now described. As shown, the flexible member 222 has two free ends 240 and 242. Further, the free ends 240 and 242 are in the position shown when the members 214 are at their extreme distance of separation from each other. Upon pulling free end 242, which is preferably positioned at hand height while the other free end 240 is disposed substantially therebelow, members 214 are caused to move toward each other. This movement is effected as a result of the force applied along the flexible member of rope 222 being transmitted through the springs 232 and apertured member 216 to the members 214. It will be understood that the springs 232 will be tensioned to a predetermined amount before movement of members 214 is effected. Application of such force to the free end 242 of flexible member 222 will be continued until the members 214 have assumed a predetermined position. It will be appreciated that the vehicle need not be centered exactly between the members 214 and that correction for any off-centering of the vehicle will be effected as a result of an increased tensioning of one of the springs 232 relative to the other said spring. When it is desired to move the members 214 away from each other, a force is applied to the free end 240 which is now at hand height, while free end 242 is now disposed substantially therebelow. Application of a force to the free end 240 permits a contraction or lessening of the tension of the springs 232 until the stop portions 230 abut against the adjacent ends of the tubular member 218. A continued application of the force to the free end 240 results in the transmission of a force through tubular member 232 and aperture members 216 to each of the members 214. The force is applied to the free end 240 until the members 214 reach a predetermined position.

From the foregoing, it will be readily appreciated that a vastly improved apparatus for elevating vehicles has been described. It has been found that through the use of an apparatus constructed in accordance with the subject invention, vehicles may be quickly, easily and safely raised and lowered. Further, such a apparatus is inexpensive to manufacture as well as simple and safe to operate. As a matter of fact, it has been found that a vehicle may be elevated in approximately ⅕ to ⅒ of the time heretofore required with prior art apparatuses. Further, an apparatus constructed in accordance with the subject invention may be used in connection will all kinds of four wheel automobiles and many of the pick-ups and trucks.

It is to be understood that this invention is not limited to the exact embodiments shown and described, which are merely by way of illustration and not apparent to those skilled in the art, and it is therefore intended that the appended claims cover all such changes and modifications.

What I claim is:

1. An apparatus for elevating a vehicle comprising a support means; a pair of members mounted on said support means for translatory movement therealong toward and away from each other; means for elevating said pair of members; means for sensing a first predetermined relation between said members and a portion of a vehicle to be disposed therebetween and generating a signal in response thereto; means responsive to said generated signal for controlling said elevating means and for effecting translatory movement of said members toward each other; means for sensing a second predetermined relation between said members and a vehicle to be disposed therebetween and generating a signal in response thereto; and means responsive to said second generated signal for controlling said elevating means and said means for effecting translatory movement of said pair of members.

2. An apparatus for elevating a vehicle comprising a support means; a pair of members mounted on said support means for translatory movement therealong toward and away from each other, each of said members having horizontally and vertically disposed vehicle engaging surface portions upon which is mounted a resilient material; means for elevating said pair of members; means for sensing a first predetermined relation between said members and a portion of a vehicle to be disposed therebetween and generating a signal in response thereto; means responsive to said generated signal for controlling said elevating means and for effecting translatory movement of said members toward each other; means for sensing a second predetermined relation between said members and a vehicle to be disposed therebetween and generating a signal in response thereto; and means responsive to said last generated signal for controlling said elevating means and said means for effecting translatory movement of said pair of members.

3. An apparatus as described in claim 2 in which said means for sensing a first predetermined relation between said members and a portion of a vehicle includes a photosensitive means.

4. An apparatus as described in claim 2 in which said vertically disposed vehicle engaging surface portions of each member are mounted for pivotal movement relative to said horizontal disposed vehicle engaging portion.

5. An apparatus for elevating a vehicle comprising a support means; a pair of members mounted on said support means for translatory movement therealong toward and away from each other, each of said members having a first, generally horizonally disposed vehicle engaging surface portion and a second generally horizontal disposed vehicle engaging surface portion; means for elevating said pair of members; means for sensing a first predetermined relation between said members and a portion of a vehicle to be disposed therebetween and generating a signal in response thereto, means responsive to said generated signal for controlling said elevating means and for effecting translatory movement of said members toward each other; means for vertically positioning said second vehicle engaging surface portions upon translatory movement of said members toward each other; means for sensing a second predetermined relation between said members and a vehicle to be disposed therebetween and generating a signal in response thereto; and means responsive to said second generated signal for controlling said elevating means and said means for effecting translatory movement of said pair of members.

6. An apparatus according to claim 5 in which said first and second vehicle engaging surface portions have a resilient material mounted thereon.

7. An apparatus as described in claim 5 in which said means for vertically positioning said second vehicle engaging surface portions includes a plurality of bell crank assemblies a portion of each being attached to the corresponding one of said second vehicle engaging surface portions and another portion thereof adapted to engage a stationary member upon retraction of said pair of members.

8. An apparatus for elevating a vehicle comprising support means; a pair of vehicle engaging members, said members being mounted on said support means for translatory movement therealong toward and away from each other, each of said members having generally horizontally and vertically disposed vehicle engaging surface portions, each of said vehicle engaging surface portions having a resilient material mounted thereon; means for elevating said pair of vehicle engaging members; means for sensing the presence of a portion of a vehicle to be disposed between said members and generating a signal in response thereto; means responsive to said generated signal for controlling said elevating means and for moving said members toward each other; means for sensing contacting engagement between said vertically disposed surface portions of said members and a portion of a vehicle and generating signal in response thereto; and means responsive to said last generated signal for controlling said elevating means and said means for moving said pair of members.

9. An apparatus for elevating a vehicle comprising a support means; a pair of members mounted on said support means for translatory movement therealong toward and away from each other, each of said members having horizontally and vertically disposed vehicle engaging surface portions; means for elevating such pair of members; means for moving said members toward each other; means for sensing contacting engagement between said vertically disposed vehicle engaging surface portions of said members and a vehicle to be disposed between said members and generating a signal in response thereto, and means responsive to said generated signal for controlling said elevating means and said means for moving said members.

10. In a vehicle elevating apparatus including an elevating means, a pair of members mounted for translatory movement toward and away from each other, means for sensing a first predetermined relation between said members and a portion of a vehicle to be disposed therebetween and generating a signal in response thereto, means responsive to said generated signal for controlling said elevating means and for effecting translatory movement of said members toward each other, means for sensing a second predetermined relation between said members and a vehicle to be disposed therebetween and generating a signal in response thereto, and means responsive to said last generated signal for controlling said elevating means and said means for effecting translatory movement of said members.

11. An apparatus for elevating a vehicle comprising a support means including a pair of rails; a pair of assemblies, each assembly including a pair of U-shaped members and a vehicle engaging member, each assembly being mounted for translatory movement on said rails toward and away from each other, each assembly being adapted for limited vertical movement relative to said rails upon application of a predetermined vertical load thereon; means for elevating a portion of each assembly relative to another portion thereof; means for sensing a first predetermined relation between said assemblies and a portion of a vehicle to be disposed therebetween and generating a signal in response thereto, said means including a photosensitive system; means responsive to said generated signal for controlling said elevating means and effecting translatory movement of said assemblies toward each other; means for sensing a second predetermined relation between said assemblies and a vehicle to be disposed therebetween and generating a signal in response thereto; and means responsive to said second generated signal for controlling said elevating means and said means for effecting translatory movement of said assemblies.

12. In a vehicle elevating apparatus including an elevating means, a pair of members mounted for translatory movement toward and away from each other; means for moving said pair of members toward and away from each other, said means including a flexible member securely attached to one end of each of a pair of springs, the other end of each of said springs, being securely attached with respect to a portion of a corresponding one of said pair of members, said flexible member passing about a stationary rotatably mounted means disposed outwardly from and adjacent one of said pair of members thereby generally dividing said flexible member into two portions, each portion thereof being attached to a corresponding end of one of said springs; and means for elevating said pair of members following the positioning thereof in a predetermined relation with respect to a vehicle to be disposed therebetween.

13. In a vehicle elevating apparatus including elevating means, a pair of members mounted for translatory movement toward and away from each other, means for sensing a first predetermined relation between said members and a portion of a vehicle to be disposed therebetween and generating a signal in response thereto, means responsive to said generated signal for controlling said elevating means and for effecting translatory movement of said members, means for sensing a second predetermined relation between said members and a vehicle to be disposed therebetween and generating a signal in response thereto, means responsive to said last generated signal for controlling said elevating means and said means for effecting translatory movement of said members.

14. In a vehicle elevating apparatus including an elevating means, a pair of members mounted for translatory movement toward and away from each other, means for sensing a first predetermined relation between said members and a vehicle disposed in a predetermined relation with respect thereto and generating a signal in response thereto, means responsive to said generated signal for controlling said elevating means and for effecting translatory movement of said members until each is disposed beneath a corresponding longitudinal edge portion of a vehicle to be elevated, and means for activating said elevating means.

References Cited by the Examiner

UNITED STATES PATENTS

| 2,637,522 | 5/1953 | Wallace | 187—8.75 |
| 2,754,934 | 7/1956 | Wallace | 187—8.59 |
| 3,117,652 | 1/1964 | Wallace | 187—8.67 |
| 3,190,395 | 6/1965 | Lill | 187—8.67 |

FOREIGN PATENTS 534,578  3/1941  Great Britain.

EVON C. BLUNK, *Primary Examiner.*

H. C. HORNSBY, *Assistant Examiner.*